United States Patent
Budnik

(10) Patent No.: US 7,079,852 B1
(45) Date of Patent: Jul. 18, 2006

(54) METHOD AND DEVICE FOR IMPROVING AUDIO QUALITY IN A MOBILE RADIO NETWORK

(75) Inventor: Bernhard Budnik, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/830,831

(22) PCT Filed: Nov. 12, 1999

(86) PCT No.: PCT/DE99/03616

§ 371 (c)(1),
(2), (4) Date: Jul. 13, 2001

(87) PCT Pub. No.: WO00/30277

PCT Pub. Date: May 25, 2000

(30) Foreign Application Priority Data

Nov. 12, 1998 (DE) ................................ 198 52 091

(51) Int. Cl.
*H04Q 7/20* (2006.01)

(52) U.S. Cl. ................ 455/456.5; 455/445; 455/452.2

(58) Field of Classification Search ................ 455/506, 455/445, 436, 401, 435, 456.5, 512, 435.2, 455/452.2, 63.1, 67.11, 552.1; 379/156, 379/9, 14; 370/280, 353
See application file for complete search history.

(56) References Cited

U.S. PATENT DOCUMENTS

| | | | | |
|---|---|---|---|---|
| 5,257,401 A | * | 10/1993 | Dahlin et al. ............... | 455/436 |
| 5,533,120 A | * | 7/1996 | Staudacher ................. | 379/392 |
| 5,706,282 A | * | 1/1998 | Chung ........................ | 370/280 |
| 5,806,002 A | * | 9/1998 | Wiatrowski et al. ........ | 455/512 |
| 5,913,176 A | * | 6/1999 | Barabash .................... | 455/560 |
| 5,999,813 A | * | 12/1999 | Lu et al. .................. | 455/435.2 |
| 6,115,459 A | * | 9/2000 | Wakabayashi .............. | 379/156 |
| 6,259,905 B1 | * | 7/2001 | Berkowitz et al. .......... | 455/401 |
| 6,292,662 B1 | * | 9/2001 | Ziv et al. .................... | 455/445 |
| 6,321,070 B1 | * | 11/2001 | Clark et al. .............. | 455/575.1 |
| 6,343,113 B1 | * | 1/2002 | Shu ............................. | 379/24 |
| 6,785,267 B1 | * | 8/2004 | Knappe ...................... | 370/353 |

FOREIGN PATENT DOCUMENTS

EP  0 685 972 A2  12/1995
EP  0 705 016 A2  4/1996

OTHER PUBLICATIONS

PCT Search Report dated Apr. 19, 2000 corresponding to PCT/DE99/03616.

* cited by examiner

*Primary Examiner*—Matthew D. Anderson
*Assistant Examiner*—Tan Trinh
(74) *Attorney, Agent, or Firm*—John M. Harrington; Kilpatrick Stockton LLP

(57) ABSTRACT

A method and a device for improving audio quality in a mobile radio network that enables audio quality to be improved in mobile radio networks independently from the terminal(s) includes an equalizer connected to the audio path assigned to be the communication link, whereby the equalizer influences the audio quality in the audio path according to the terminal(s) involved in the communication link. The audio characteristics of a network can thus be set by a network operator.

16 Claims, 1 Drawing Sheet

METHOD AND DEVICE FOR IMPROVING AUDIO QUALITY IN A MOBILE RADIO NETWORK

Figure 1:
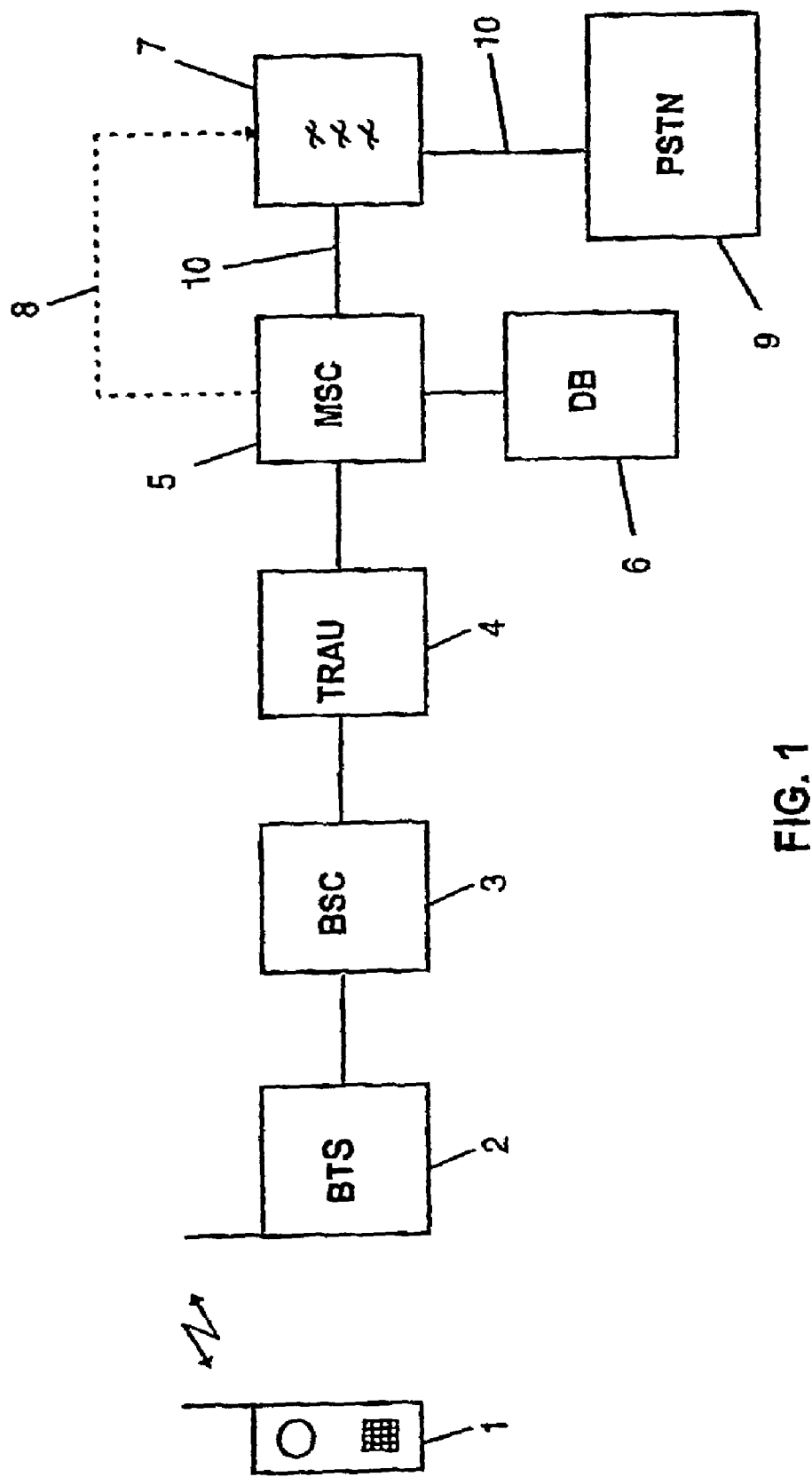

The invention concerns a procedure and equipment for improving audio quality in a mobile radio network.

The mobile radio network, e.g. the GSM-mobile radio network, is—apart from a given range limitation and the used speech decoder—sound (acoustic pattern) neutral.

The sound perceived by the mobile radio user is determined primarily by the mobile radio equipment being used; whereby, each manufacturer of the equipment "stamps" a different sound into his equipment. The currently available end device models have, to a great extent, large sound differences, which are perceived by the device users to be pleasant or less-than-pleasant.

It was determined by public opinion polls and surveys, for example, that the GSM1800 networks have a better sound than the GSM900 networks. Since this cannot be comprehended technically, it seems a likely supposition that this is because of the equipment's characteristics; that is, the better sound results not from the GSM1800 networks, but from the end devices used in this network.

A procedure for the user's individual improvement of sound quality with telephones is made known in EP-A-0 705 016. Before or during a discussion connection, the quality of sound can be improved in the current discussion connection, according to specifications or settings of the user by appropriate equipment in the communications network. For this, the user inputs the desired specifications or settings manually by his/her telephone, or his/her identity is determined automatically by the communcations network so that based on the determined identity, whose specifications have been previously set, are recalled from a data base. The improvement of the sound quality, which is dependent on the end equipment or device, is not provided.

The invention is based on the fact that a tone control or equalizer is switched into a corresponding audio path in a communication connection, which influences the audio quality in the audio path, dependent on the type of equipment or devices used in the connection.

The task is solved by the characterizing features in Patent claim 1.

The invention is based on the fact that a tone control is switched into a corresponding communication connection's audio path, which influences the audio quality in the audio path, dependent on the type of equipment or devices used in the connection, in that the sound is changed in the audio path.

Thus, the advantage is achieved that if there are eventual deficiencies of the audio quality of individual end device models, adjustments can be made on the network side, i.e. unnoticed by the user.

Now the network carrier, not the end device manufacturer, determines the sound characteristics of its network by determining the characteristics of the end devices' sound for each end device model.

This results in a direct quality leap for a network equipped with the invention. An end device with an inferior sound in a convention network gets a good sound quality in a network that uses the invention. The device user is then connected directly to the network quality, as shown above in the given opinion surveys.

Together with the end device, a tone control is configured into one of the audio paths so that it, for example, increases the level with a particularly muffled sounding device. In a further development of the invention, it is provided that the influence of the audio quality is different in the connection direction from the calling user to the called user and from the called user to the calling user.

The mobile switching center (MSC) determines by query of the mobile equipment identification (IMEI: International Mobile Equipment Identity) the device model. The query of the IMEI is usually always already completed with the authentication procedure between the mobile station and the mobile radio network, so that the mobile radio network accepts only devices or equipment with certified IMEI.

For each type of device, the corresponding sound parameters are stored and are at any time accessible in the data bank of the mobile switching center. The tone control of the corresponding audio path is configured on the basis of the sound parameters stored in a certain type of equipment or device. The sound parameter can also be pre-held advantageously in the tone control itself.

The control signal for controlling the tone control is preferably supplied or prepared by the mobile switching center, but can also be prepared or supplied by any other authority of the mobile radio network. It is also conceivable to follow the signaling by means of a separate trace-device on the different interfaces of the mobile radio systems and to steer the tone control with the data derived from it.

In a preferred embodiment of the invention, the tone control is located close to the Transcoder/Rate Adaption Unit (TRAU) and can preferably be equipped as a part of the code conversion. The code conversion TRAU converts from the base station control BSC PCM-A-Law in a 64 Kbytes (Kbits)/s-signal, which is further processed in the mobile switching center (MSC).

In accordance with another embodiment, the tone control, as a separate unit of the code conversion, is pre-switched or subsequently switched. The tone control can also be placed in the mobile switching center. It is just important that the tone control is switched, seen from the installation expense perspective, at a favorable position in the audio path. A preferred position is, for example, there where there are a multiplicity of audio channels; also, for example in the TRAU or the MSC. The tone control includes, preferably, not only one tone control unit, but also a multiplicity of tone control units, which can be assigned to one audio path or audio channel.

In a further development of the invention, it is provided that the control signal for the tone control is not only a function of the mobile equipment identification (IMEI), but also as a function of the user's individual features. The tone control could be adjusted differently as, e.g. for the private user, business user, guest user, hearing-impaired user, etc.

Finally, the possibility also exists of using the tone control for speech coding/encoding.

In the following, the invention is more closely described on the basis of an embodiment example with reference to the drawing. Further characteristics, features and advantages of the invention are shown in the drawings.

FIG. 1 shows an example of a GSM-mobile radio network that basically involves equipment at a communication connection between the mobile radio user and the user of a public stationary network.

The mobile radio user would like to make a voice connection by means of a mobile radio end device to a user of a public stationary network (9) and enters over a base station (2) in the mobile radio network. The structure of the network is made in a known manner first by the base station (2), the base station control (3) to the mobile switching center (5), which takes over the further connection structure to the public stationary network (9). Between the base station control (3) and the mobile switching center (5), a code conversion (Transcoder/Rate Adaption Unit) is switched on, which can be placed, e.g. within the mobile switching center (5).

Now a tone control (7) is, according to the invention, switched into the audio path (10) of the connection, which is located preferably also in the area of the mobile switching center (5). the tone control (7) is guided by the mobile switching center (5) over a control signal (8). The mobile switching center (5) determines the device model (1) used by the mobile radio user during the construction of the connection by query of the mobile equipment identification (IMEI). The query of the IMEI corresponds to the standards intended by GSM. Each marketable type of device and equipment has corresponding sound parameters stored in a data bank (6) of the mobile switching center (5) and are accessible at any time. On the basis of the sound parameters stored to a certain type of device or equipment, the tone control (7) by the control signal (8) is configured by the connection of the corresponding audio paths. The sound parameters can also be advantageously pre-held in the tone control (7) itself. The tone control (7) now influences, corresponding to the specification, the sound in the audio path (10) and improves, corrects and/or evens out the sound.

The invention claimed is:

1. Procedure to improve the audio quality in a mobile radio network, with which a tone control that is switched into one of the communication connection's corresponding audio paths that, dependent upon the types of end device(s) or equipment being used in the connection, influences the audio quality in the audio path, in that a frequency response of a sound in the audio path is changed, and further comprising a base station controller, as well as a mobile switching center, that determines the end device type(s) by query of a mobile equipment identification and assigns to the appropriate end device type corresponding pre-determined parameters, which serve to adjust the tone control.

2. Procedure, according to claim 1, is characterized by the influence of audio quality that is different in the connection direction from the caller to the called user and from the called user to the calling user.

3. Procedure, according to claim 2, is characterized by the parameters that are stored for all marketable mobile radio device and equipment in a data storage (memory) and can be recalled when needed.

4. Procedure, according to claim 3, is characterized by the fact that stored parameters of the tone control of the corresponding audio path are configured based on the type of end device.

5. Procedure, according to claim 4, is characterized by the parameters that are transferred by one of the mobile switching centers or another network component supplied control signal to the tone control.

6. Procedure, according to claim 5, is characterized by the tone control that is switched into the audio path in the area of the mobile switching center or the base station control.

7. Procedure, according to claim 5, is characterized by the tone control that is switched into the audio path in the area of the code conversion equipment (Transcoder/Rate Adaption Unit).

8. Procedure, according to claim 7, is characterized by the tone control that is adjusted dependent upon the users' individual features.

9. Devices or equipment to complete the procedure, according to claim 8, encompassing a tone control that is switched into a communication connection's audio path.

10. Equipment, according to claim 9, is characterized by the tone control that is located in the base station control.

11. Equipment, according to claim 9, is characterized by the tone control that is located in the mobile switching center.

12. Equipment, according to claim 9, is characterized by the tone control that is part of the code conversion equipment (Transcoder/Rate Adaption Unit).

13. Equipment, according to claim 9, is characterized by the tone control that is connected or switched before or after the code conversion device (Transcoder/Rate Adaption Unit).

14. Equipment, according to claim 9, is characterized by the tone control that includes a multiplicity of tone control units, which correspond in each case to an audio path.

15. Procedure to improve the audio quality in a mobile radio network, with which an equalizer that is switched into one of the communication connection's corresponding audio paths that, dependent upon the types of end device(s) or equipment being used in the connection, influences the audio quality in the audio path, in that a sound in the audio path is changed, and a base station controller, as well as a mobile switching center, that determines the end device type(s) by query of a mobile equipment identification and assigns to the appropriate end device type corresponding pre-determined parameters, which serve to adjust the tone control.

16. A method for improving audio quality in a mobile radio network, comprising:

identifying a type of end device in a communication connection by query from a base station controller, as well as a mobile switching center, of a mobile equipment identification for the end device;

accessing pre-determined parameters for adjusting a tone control in an audio path of the communication connection corresponding to the identified type of end device; and influencing a quality of audio in the audio path by changing a frequency response of a sound in the audio path by the tone control according to the pre-determined parameters.

* * * * *